United States Patent Office 2,796,422
Patented June 18, 1957

2,796,422

CERTAIN ARYLAMINO, NITROPHENYL SULFONIC ACID ARYL ESTERS

Hans Wilhelm Liechti, Oberwil, and Rudolf Ruegg, Basel, Switzerland, assignors to Ciba Limited, Basel, Switzerland, a Swiss firm No Drawing. Application November 19, 1954,
Serial No. 470,132

Claims priority, application Switzerland
November 27, 1953

7 Claims. (Cl. 260—309.2)

This invention provides as new nitro-dyestuffs diarylamines which are free from groups imparting solubility in water and which contain in the same aryl nucleus a nitro group in ortho-position to the nitrogen bridge and a sulfonic acid aryl ester group in para-position to the nitrogen bridge.

The invention also includes a process for making the above dyestuffs, wherein an aryl compound which contains in ortho-position to a nitro group a substituent exchangeable for an amino group, advantageously a halogen atom, and in para-position to the said substituent a substituent convertible into sulfonic acid ester group, is treated, on the one hand, to convert into a sulfonic acid aryl ester group the substituent so convertible and, on the other, to exchange for an arylamino group the substituent exchangeable for an amino group, and the starting materials are so chosen that the resulting nitro-dyestuff is free from groups imparting solubility in water.

The substituent exchangeable for an amino group may be, for example, an alkoxy group of low molecular weight having, for example, at most two carbon atoms, or more especially a halogen atom, for example, a bromine atom or advantageously a chlorine atom. The aryl compound so substituted may belong to the naphthalene series or preferably the benzene series.

As substitutents convertible into a sulfonic acid ester group there come into consideration sulfonic acid halide groups, advantageously sulfonic acid chloride groups. From the foregoing it will be understood that 1-halogen-2-nitrobenzene-4-sulfonic acid halides are suitable starting materials for the present process. Compounds of this kind are known and can be made by methods in themselves known, for example, by treating an appropriate halogen-nitrobenzene sulfonic acid with an acid-halogenating agent such as phosphorus pentabromide or phosphorus pentachloride. The halogen-nitrobenzene sulfonic acid chlorides are generally obtained with advantage by reacting a 1-halogen-2-nitrobenzene with chlorosulfonic acid.

The substituent convertible into a sulfonic acid ester group is converted by the present process, for example, into a sulfonic acid naphthyl ester group or advantageously a sulfonic acid phenyl ester group. The aryl radical may contain further substituents, for example, halogen atoms, such as chlorine, or alkyl or alkoxy groups of low molecular weight such as methyl, ethyl, methoxy or ethoxy groups. Thus, for example, by reacting a 1-halogen-2-nitrobenzene-4-sulfonic acid chloride with an hydroxybenzene or hydroxynaphthalene there can be obtained the following 1-halogen-2-nitrobenzene-4-sulfonic acid aryl esters, which are subsequently condensed with an arylamine to form the final products in accordance with the present process:

1-chloro-2-nitrobenzene-4-sulfonic acid phenyl ester,
1-chloro-2-nitrobenzene-4-sulfonic acid-(4'-chlorophenyl ester),
1 - chloro - 2 - nitrobenzene-4-sulfonic acid-(2'-methylphenyl ester),
1-chloro-2-nitrobenzene-4-sulfonic acid-(4'-β:β-dimethylpropyl-phenyl ester),
1-chloro-2-nitrobenzene-4-sulfonic acid α-naphthyl ester,
1-chloro-2-nitrobenzene-4-sulfonic acid β-naphthyl ester,
1 - chloro-2-nitrobenzene-4-sulfonic acid (4'-methoxyphenyl-ester),
1-chloro-2-nitrobenzene-4-sulfonic acid (2'-phenylphenyl-ester),
1-chloro-2-nitrobenzene-4-sulfonic acid (3'-N:N-dimethylaminophenyl ester),
1:6-dichloro-2-nitrobenzene-4-sulfonic acid phenyl ester,
1-chloro-2:6-dinitrobenzene-4-sulfonic acid phenyl ester,
1-chloro-2-nitrobenzene-4-sulfonic acid (2':4' - dichlorophenyl ester),
1-chloro-2-nitrobenzene-4-sulfonic acid (4'-ethoxyphenyl ester),
1-chloro-2-nitrobenzene-4-sulfonic acid phenyl ester-2'- or -4'-carboxylic acid amide,
1-chloro-2-nitrobenzene-4-sulfonic acid phenyl ester-2'- or -4'-carboxylic acid ethyl ester.

As in the case of the aryl nucleus of the sulfonic acid aryl group, the aryl nucleus of the arylamino group to be introduced into the dyestuff molecule may contain substituents. However, it is of advantage to use arylamines which are free from substituents of pronounced negative character (electron-attracting substituents), for example, nitro groups, sulfonic acid ester groups and alkylsulfone or aryl-sulfone groups. The aryl nucleus of the arylamine is also advantageously a benzene nucleus. In order to exchange the substituent present in the 1-position of the aforesaid nitro-aryl-compound for an arylamino group there may be used, for example, the following arylamino compounds of the benzene or naphthalene series:

Aminobenzene,
1-amino-2-, -3- or -4-methylbenzene,
1-amino-2-, -3- or -4-methoxybenzene,
1-amino-2-, -3- or -4-chlorobenzene,
1:3- or 1:4-diaminobenzene,
1-amino-3- or -4-acetylaminobenzene,
1-amino-4-dimethylaminobenzene,
1-amino-2:4-, -2:5- or -2:6-dimethylbenzene,
1-amino-2-methoxy-5-methylbenzene,
1-amino-2:5-dimethoxybenzene,
1- or 2-aminonaphthalene,
N-monomethylaminobenzene,
1-amino-4- or -2-phenylaminobenzene,
1-amino-4- or -2-phenoxybenzene,
2-methyl-5-aminobenzimidazole.

From the foregoing it will be understood that the two reactions of the present process may be carried out in either order of succession. Thus, for example, the arylamino group may first be introduced and the sulfonic acid aryl ester group subsequently introduced, after converting the sulfonic acid group into a sulfonic acid halide group. In most cases the reverse order of succession is preferable, in which first the substituent convertible into a sulfonic acid ester group is converted into a sulfonic acid aryl ester group and in the resulting aryl compound, which contains in ortho-position to a nitro group and in para-position to the sulfonic acid aryl ester group a substituent exchangeable for an amino group, the latter substituent is exchanged for an arylamino group.

The reactions of the present process may be carried out by methods in themselves known. Thus, for example, the reaction of the sulfonic acid halide with the hydroxy-aryl compound is advantageously carried out in an aqueous medium with the addition of an alkali hydroxide at a moderately raised temperature. The halogen-nitroaryl sulfonic acid aryl ester so obtained may then advantageously be condensed with the arylamine with the aid of heat in an aqueous medium or in an organic solvent, for example, in ethyl alcohol.

The new nitro-dyestuffs are diarylamines which are free from groups imparting solubility in water and which contain as substituents in the same aryl nucleus a nitro group in ortho-position to the nitrogen bridge and a sulfonic acid aryl ester group in para-position to the nitrogen bridge. Especially valuable are those nitro-dyestuffs which contain a single nitro group.

The new dyestuffs are soluble in organic solvents but are practically insoluble in water, and can be used for coloring various materials, for example, oils, fats, waxes and also products made therefrom. However, these dyestuffs are especially valuable for dyeing fibers or foils composed of polyvinyl chloride, of cellulose esters such as acetyl-cellulose, or of polyesters of aromatic dicarboxylic acids, especially polyesters of terephthalic acid, by the dispersion dyeing method. For this method of dyeing it is generally desirable to subject the dyestuff to a suitable pasting operation. Good results are obtained, for example, by using sulfite cellulose waste liquor, a condensation product of a higher alcohol with ethylene oxide, a soap or sodium $\mu$-heptadecyl-N-benzyl-benzimidazole disulfonate as dispersing agent. There may be used two or more dispersing agents, for example, one for the pasting operation and another as an addition during or immediately preceding the preparation of the dyebath. Furthermore, it may be of advantage to treat the dyestuff with a water-soluble organic solvent before dyeing or when the dispersing agent is added, so that the dyestuff is at least partially dissolved. In dyeing fibers of cellulose acetate artificial silk or polyvinyl chloride the sensitivity of these fibers to heat should be taken into account, so that generally a maximum temperature of 90° C. should not be exceeded. On the other hand, in dyeing fibers of polyesters of terephthalic acid, for example, staple fibers or continuous filaments thereof, this difficulty does not arise and in general it is of advantage to work at the boiling temperature of the dyebath or, if a closed vessel is used, at an even higher temperature.

The dyeings so produced are distinguished by their good properties of wet fastness, and especially by their good fastness to light.

The following examples illustrate the invention, the parts and percentages being by weight:

Example 1

94 parts of hydroxybenzene and 256 parts of 1-chloro-2-nitrobenzene-4-sulfonic acid chloride are introduced into 500 parts of water. There is then introduced dropwise at 30–40° C. a solution of 40 parts of sodium hydroxide in 400 parts of water at a rate such that the pH value of the reaction mixture is maintained at 7–8. After 5–6 hours, that is to say, when the addition of the sodium hydroxide solution is complete, the mixture is stirred for a further hour. 10 parts of anhydrous sodium carbonate are then added to the neutral reaction mixture, the whole is stirred for a further hour, and the condensation product is separated. By recrystallizing the product from alcohol there is obtained 1-chloro-2-nitrobenzene-4-sulfonic acid phenyl ester in the form of a colorless powder melting at 71° C.

313.5 parts of 1-chloro-2-nitrobenzene-4-sulfonic acid phenyl ester thus obtained and 186 parts of aminobenzene are heated in 1000 parts of alcohol for 3 hours under reflux at 80° C. The reaction mixture is then poured into a solution of 250 parts of hydrochloric acid of 30 percent strength in 2500 parts of water. The dyestuff of the constitution

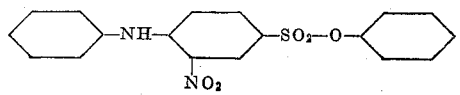

which precipitates in large flocks, is isolated and recrystallized from alcohol. It is a yellow powder which melts at 112° C. and dyes cellulose acetate artificial silk and fibers of polyesters of terephthalic acid neutral yellow tints of excellent fastness to light.

Further valuable dyestuffs are obtained in the manner described above by making from the appropriate hydroxyaryl compounds and 1-chloro-2-nitrobenzene-4-sulfonic acid the sulfonic acid esters named in column I of the following table and reacting the esters with the amines named in column II. The dyestuffs yield on cellulose acetate silk or fibers of polyesters of terephthalic acid dyeings of the tints given in column III.

| | I<br>Sulfonic acid ester | II<br>Amine | III<br>Tints |
|---|---|---|---|
| 1 | 1-chloro-2-nitrobenzene-4-sulfonic acid phenyl ester. | N-monomethyl-aniline. | reddish-yellow. |
| 2 | ----do---- | 1-amino-2-methyl-benzene. | yellow. |
| 3 | ----do---- | 1-amino-3-methyl-benzene. | Do. |
| 4 | ----do---- | 1-amino-4-methyl-benzene. | Do. |
| 5 | ----do---- | 1-amino-2-methoxy-benzene. | reddish yellow. |
| 6 | ----do---- | 1-amino-3-methoxy-benzene. | Do. |
| 7 | ----do---- | 1-amino-4-methoxy-benzene. | Do. |
| 8 | ----do---- | 1-amino-2-chloro-benzene. | greenish yellow. |
| 9 | ----do---- | 1-amino-3-chloro-benzene. | Do. |
| 10 | ----do---- | 1-amino-4-chloro-benzene. | Do. |
| 11 | ----do---- | 1:3-diaminobenzene. | reddish yellow. |
| 12 | ----do---- | 1:4-diaminobenzene. | Do. |
| 13 | ----do---- | 1-amino-3-acetyl-aminobenzene. | yellow. |
| 14 | ----do---- | 1-amino-4-acetyl-aminobenzene. | Do. |
| 15 | ----do---- | 1-amino-4-dimethyl-aminobenzene. | brown orange. |
| 16 | ----do---- | 1-aminonaphthalene. | reddish yellow. |
| 17 | ----do---- | 2-aminonaphthalene. | Do. |
| 18 | ----do---- | 1-amino-2:5-dimethylbenzene. | yellow. |
| 19 | ----do---- | 1-amino-2-methoxy-5-methylbenzene. | Do. |
| 20 | ----do---- | 1-amino-2:5-dimethoxybenzene. | Do. |
| 21 | 1-chloro-2-nitrobenzene-4-sulfonic acid-(4'-chlorophenyl ester). | aminobenzene. | Do. |
| 22 | ----do---- | 1-amino-4-methyl-benzene. | Do. |
| 23 | ----do---- | 1-amino-4-methoxy-benzene. | reddish yellow. |
| 24 | ----do---- | 1-amino-4-chloro-benzene. | greenish yellow. |
| 25 | 1-chloro-2-nitrobenzene-4-sulfonic acid-(2'-methyl phenyl ester). | aminobenzene. | yellow. |
| 26 | ----do---- | 1-amino-4-methyl-benzene. | Do. |
| 27 | ----do---- | 1-amino-4-methoxy-benzene. | reddish yellow. |
| 28 | ----do---- | 1-amino-4-chloro-benzene. | greenish yellow. |
| 29 | 1-chloro-2-nitrobenzene-4-sulfonic acid-(4'-β-dimethyl-propyl-phenyl-ester). | aminobenzene. | yellow. |
| 30 | ----do---- | 1-amino-4-methyl-benzene. | Do. |
| 31 | ----do---- | 1-amino-4-methoxy-benzene. | reddish yellow. |
| 32 | ----do---- | 1-amino-4-chloro-benzene. | greenish yellow. |
| 33 | 1-chloro-2-nitrobenzene-4-sulfonic acid-α-naphthyl ester. | aminobenzene. | yellow. |
| 34 | ----do---- | 1-amino-4-methyl-benzene. | Do. |
| 35 | ----do---- | 1-amino-4-methoxy-benzene. | reddish yellow. |
| 36 | ----do---- | 1-amino-4-chloro-benzene. | yellow. |
| 37 | 1-chloro-2-nitrobenzene-4-sulfonic acid phenyl ester. | 1-amino-4-ethoxy-benzene. | reddish yellow. |
| 38 | ----do---- | 2-methyl-5-amino-benzimidazole. | Do. |
| 39 | 1-chloro-2-nitrobenzene-4-sulfonic acid-(4'-chlorophenyl ester). | ----do---- | Do. |
| 40 | 1-chloro-2-nitrobenzene-4-sulfonic acid-β-naphthyl ester. | 1-aminobenzene. | yellow. |
| 41 | ----do---- | 1-amino-4-methyl-benzene. | Do. |
| 42 | ----do---- | 1-amino-4-methoxy-benzene. | reddish yellow. |

| | I<br>Sulfonic acid ester | II<br>Amine | III<br>Tints |
|---|---|---|---|
| 43 | 1-chloro-2-nitrobenzene-4-sulfonic acid-β-naphthyl ester. | 1-amino-4-chlorobenzene. | yellow. |
| 44 | 1-chloro-2-nitrobenzene-4-sulfonic acid-(4'-ethoxyphenyl ester). | 1-aminobenzene. | Do. |
| 45 | ___do___ | 1-amino-4-chlorobenzene. | Do. |
| 46 | ___do___ | 1-amino-4-methoxybenzene. | reddish yellow. |
| 47 | ___do___ | 2-methyl-5-aminobenzimidazole. | Do. |
| 48 | 1-chloro-2-nitrobenzene-4-sulfonic acid-2'-carboxylic acid amide. | 1-aminobenzene. | yellow. |
| 49 | ___do___ | 1-amino-4-methoxybenzene. | reddish yellow. |
| 50 | ___do___ | 1-amino-2-chlorobenzene. | greenish yellow. |
| 51 | 1-chloro-2-nitrobenzene-4-sulfonic acid-phenyl ester 4'-carboxylic acid amide. | 1-aminobenzene. | yellow. |
| 52 | ___do___ | 1-amino-4-methoxybenzene. | reddish yellow. |
| 53 | ___do___ | 1-amino-4-chlorobenzene. | greenish yellow. |
| 54 | 1-chloro-2-nitrobenzene-4-sulfonic acid-phenyl ester 4'-carboxylic acid ethyl ester. | 1-aminobenzene. | yellow. |
| 55 | ___do___ | 1-amino-4-methoxybenzene. | reddish yellow. |
| 56 | ___do___ | 1-amino-4-chlorobenzene. | greenish yellow. |
| 57 | 1-chloro-2-nitrobenzene-4-sulfonic acid-(2':4'-dichlorophenyl ester). | 1-aminobenzene. | Do. |
| 58 | ___do___ | 1-amino-4-methylbenzene. | Do. |
| 59 | ___do___ | 1-amino-4-chlorobenzene. | Do. |
| 60 | ___do___ | 1-amino-4-acetylaminobenzene. | Do. |
| 61 | ___do___ | 1-amino-4-methoxybenzene. | yellow. |
| 62 | ___do___ | 2-methyl-5-aminobenzimidazole. | Do. |

*Example 2*

256 parts of 1-chloro-2-nitrobenzene-4-sulfonic acid chloride are introduced in small portions, while stirring vigorously, at 45-50° C., into a solution of 94 parts of hydroxybenzene in 500 parts of water and 44 parts of sodium hydroxide of 100 percent strength. The mixture is then stirred for a further 3 hours at 50-55° C., then the mixture is cooled to 20° C., and the reaction product is separated. After recrystallization from alcohol the product melts at 71° C. and is identical with the product described in the first paragraph of Example 1.

313.5 parts of this compound and 186 parts of aminobenzene are heated at the boil under reflux in 1500 parts of water for 3 hours. The reaction mass is introduced into a solution of 250 parts of hydrochloric acid of 30 percent strength in 1000 parts of water. The precipitated dyestuff is isolated and dried. After recrystallization from alcohol, it melts at 112° C. and is identical with the final product of Example 1.

*Example 3*

237.5 parts of 1-chloro-2-nitrobenzene-4-sulfonic acid and 372 parts of aminobenzene are heated for 3 hours at the boil under reflux. The cooled reaction mass is introduced into 1200 parts of hydrochloric acid of 10 percent strength, and the precipitate so formed is separated by filtration. It is dissolved in a hot dilute solution of potassium carbonate, and the solution is mixed with active carbon and filtered while hot. By means of potassium chloride there is precipitated from the filtrate the potassium salt of 2-nitro-diphenylamine-4-sulfonic acid, and the latter is separated from the mother liquor by filtration and dried in vacuo.

332 parts of this compound are introduced into 2000 parts of phosphorus hydroxychloride. 315 parts of phosphorus pentachloride are added, and the whole is heated at 80° C. until dissolution is complete. The cooled reaction mixture is introduced into 6000 parts of ice water, and the mixture is allowed to stand until the 2-nitro-diphenylamine-4-sulfonic acid chloride has solidified. The latter is then separated from the acid solution and dried in vacuo. The product melts in the crude state at 95° C., and melts at 104° C. after recrystallization from ether.

312.5 parts of 2-nitro-diphenylamine sulfonic acid chloride are introduced into a solution of 94 parts of hydroxybenzene in 600 parts of water and 44 parts of sodium hydroxide. The mixture is heated for 4 hours at 60-65° C., and then allowed to cool, and the dyestuff, which precipitates in yellow flocks, is separated by filtration. It is identical with the dyestuff of Example 1.

*Example 4*

1 part of the dyestuff obtainable as described in the first and second paragraphs of Example 1 is ground wet with 2 parts of an aqueous solution of 50 percent strength of sulfite cellulose waste liquor and dried. The dyestuff is pasted with 4 parts of ethyl alcohol, then stirred with 20 parts of an aqueous solution of 10 percent strength of a condensation product of octadecyl alcohol with 20 molecular proportions of ethylene oxide, and the mixture is diluted with water to form 4000 parts of a dyebath. 100 parts of a yarn of staple fibers composed of a polyester of terephthalic acid, for example, one which is available in commerce under the name "Dacron" or "Terylene," are entered into the dyebath at 60° C., the temperature is raised to the boil in the course of ½ hour, and dyeing is carried on for one hour at that temperature. The material is then rinsed and dried. There is obtained a yellow dyeing of extraordinarily good fastness to light.

By dyeing in like manner a fabric composed of continuous filaments of such a polyester, a similarly good result is obtained.

By dyeing a fabric of cellulose acetate artificial silk by the same procedure, except that the temperature is not raised above 90° C., a strong yellow dyeing of excellent fastness to light is likewise produced.

What is claimed is:

1. A diarylamine of the formula

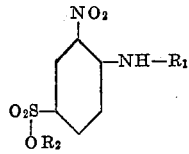

wherein $R_1$ represents a member selected from the group consisting of the phenyl, chlorophenyl, methylphenyl, dimethylphenyl, methoxyphenyl, dimethoxyphenyl, ethoxyphenyl, methoxymethylphenyl, aminophenyl, dimethylaminophenyl, acetylaminophenyl, and naphthyl radicals and the radical of the formula

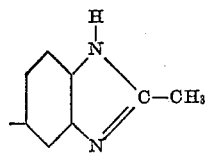

and $R_2$ stands for a member selected from the group consisting of the phenyl, chlorophenyl, dichlorophenyl, alkylphenyl, methoxyphenyl, ethoxyphenyl, carbethoxyphenyl, carboxamidophenyl and naphthyl radicals, the alkyl group of the alkylphenyl radical having at most 5 carbon atoms.

2. A diarylamine of the formula

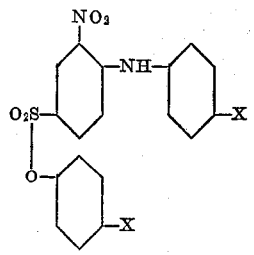

wherein one of the X's represents an alkoxy group of at most 2 carbon atoms and the other X a hydrogen atom.

3. The diarylamine of the formula

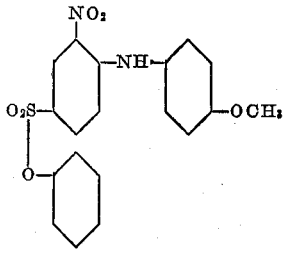

4. The diarylamine of the formula

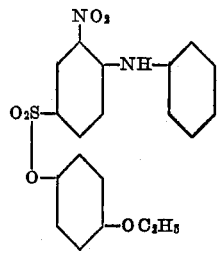

5. The diarylamine of the formula

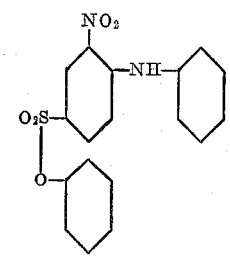

6. The diarylamine of the formula

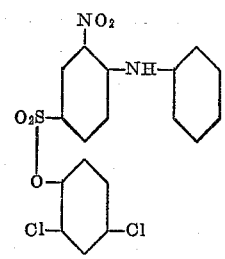

7. The diarylamine of the formula

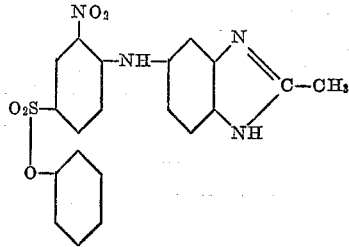

References Cited in the file of this patent
UNITED STATES PATENTS

| | | |
|---|---|---|
| 1,646,785 | Duisberg et al. | Oct. 25, 1927 |
| 2,134,642 | Petticolas et al. | Oct. 25, 1938 |
| 2,443,666 | Seymour et al. | June 22, 1948 |

FOREIGN PATENTS

| | | |
|---|---|---|
| 662,645 | Great Britain | Dec. 12, 1951 |